United States Patent [19]

Sakazume

[11] 4,307,815
[45] Dec. 29, 1981

[54] RESERVOIR TANK
[75] Inventor: Takeshi Sakazume, Kawasaki, Japan
[73] Assignee: Tokico Ltd., Kawasaki, Japan
[21] Appl. No.: 170,878
[22] Filed: Jul. 21, 1980
[30] Foreign Application Priority Data Jul. 20, 1979 [JP] Japan .............................. 54-101239

[51] Int. Cl.³ ...................... B60T 11/22; B65D 51/16; B60T 11/26
[52] U.S. Cl. .................. 220/85 B; 60/585; 188/345
[58] Field of Search ...................... 220/85 B; 60/585; 188/345

[56] References Cited

U.S. PATENT DOCUMENTS 3,173,265  3/1965  Bixby .............................. 220/85 B
3,196,617  7/1965  Ferrell ................................ 60/585
4,004,707  1/1977  Snyder .......................... 220/85 B
4,135,635  1/1979  Fujii ............................. 220/85 B

FOREIGN PATENT DOCUMENTS 52-68681  6/1977  Japan ................................ 60/585

Primary Examiner—George E. Lowrance
Attorney, Agent, or Firm—Wenderoth, Lind & Ponack

[57] ABSTRACT

A reservoir tank having a flexible diaphragm disposed above the liquid received in the reservoir tank for intercepting the liquid from being exposed to atmospheric air. The diaphragm has a corrugated form consisting of at least one annular upwardly projecting portion and at least on annular upwardly projecting portion surrounded by the annular downwardly projecting portion, and at least one cut-out portion is formed in the annular downwardly projecting portion to define a horizontally extending escape passage across the annular downwardly projecting portion.

4 Claims, 5 Drawing Figures

RESERVOIR TANK

BACKGROUND OF THE INVENTION

This invention relates to a reservoir tank and, particularly to a reservoir tank integrally provided with a master cylinder used in the hydraulic braking system of a vehicle.

Conventional hydraulic liquid used in hydraulic systems will deteriorate when the liquid is exposed to atmospheric air, and further, when the reservoir tank in the hydraulic system contains therein a large amount of air, particularly when the amount of hydraulic liquid received in the reservoir tank is decreased, the air in the reservoir will sometimes be sucked into the hydraulic system, thereby causing the so-called air lock phenomenon. Such phenomenon is particularly observed in vehicle hydraulic braking systems since the vibrations caused by the operation of the vehicle will act to stir the liquid in the reservoir tank. Therefore, the reservoir tank in the vehicle hydraulic braking system usually has a closed type constructon, in which a flexible diaphragm is provided in the reservoir tank and above the level of the liquid received in the tank so as to minimize the amount of air contained in the reservoir tank and contacting with the liquid. It has been required that the diaphragm can freely follow the change in the liquid level without generating any negative pressure.

Two types of flexible diaphragms having corrugated wall portions have usually been utilized in prior art reservoir tanks and, one of which includes vertically arranged annular corrugated portions (having vertically extending wave like shaped configurations in the vertical cross-section), and the other of which includes at least one set of annular upwardly and downwardly projecting portions (having horizontally extending wave like shaped configuration in the vertical cross-section) to define a corrugated form.

In the former, the construction of the mold, particularly the constructon of the inner mold utilized in manufacturing the diaphragm is complicated, and thus, the manufacturing costs are expensive. In the latter, the mold utilized in manufacturing the diaphragm consists of the upper and lower molds, and thus, the manufacturing costs can be reduced; however, since the annular downwardly projecting portion is arranged to surround the annular upwardly projecting portion as viewed in the horizontal direction, thereby defining a downwardly opening closed space, particularly when the diaphragm is in the contracted condition, a substantial amount of air or foam will be trapped in the space. The air or foam trapped in such space will sometimes be sucked into the hydraulic system thereby causing the so-called air lock phenomenon.

SUMMARY OF THE INVENTION

One of the objects of the invention is to avoid the aforesaid shortcomings by providing a new and improved flexible diaphragm for use in a reservoir tank.

According to the present invention, there is provided a reservoir tank for containing therein hydraulic liquid and having a flexible diaphragm disposed above the liquid received in the reservoir tank for preventing the liquid from being exposed to the atmospheric air, wherein the diaphragm includes at least one set of annular upwardly and downwardly projecting portions having a corrugated form for permitting expanding and contracting of the diaphragm in the vertical directions, and at least one cut-out portion is formed in the annular downwardly projecting portion for allowing the fluid which is trapped in a space which is surrounded by the annular downwardly projecting portion to escape in the horizontally outward direction.

The mixing of the air into the liquid can be minimized and the manufacturing costs of the diaphragm can be reduced.

The invention will hereinafter be explained in detail with reference to the accompanying drawings.

DETAILED DESCRIPTION OF THE PREFERRED EMBODIMENTS

Figure 3:
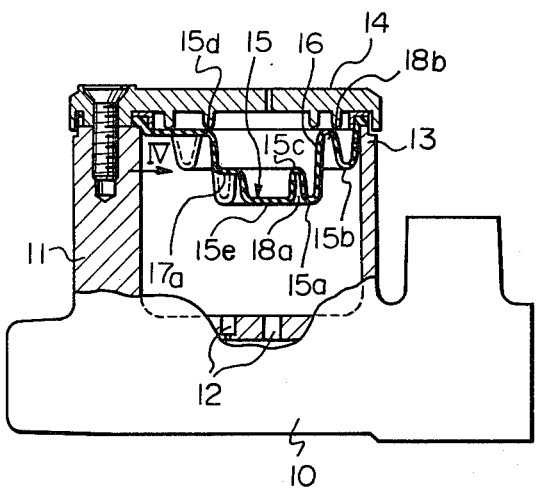
FIG. 3 is a partial longitudinal sectional view of a master cylinder having a reservoir tank according to the invention.
Figure 4:
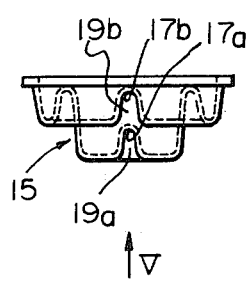
FIG. 4 is a side view as viewed along arrow IV in FIG. 3 and showing a diaphragm provided in the upper portion of the reservoir tank.

The master cylinder shown in FIG. 3 comprises a cylinder housing 10 defining therein a cylinder bore which receives therein a piston (not shown). A reservoir tank 11 is integrally formed with the cylinder housing 10 on the upper portion thereof, and the interior of the reservoir tank 11 is communicated with the cylinder bore through openings 12. The upper end of the reservoir tank 11 is closed by a cap 13, and a flexible diaphragm 15 according to the invention is sealingly clamped between the reservoir tank 11 and the cap 13.

Figure 1:
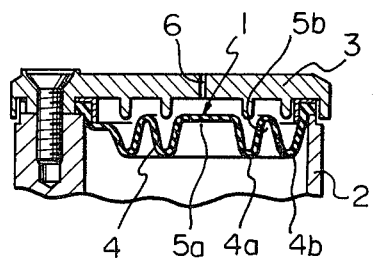
FIG. 1 is a partial cross-sectional view of the upper portion of a reservoir tank having a prior art diaphragm.
Figure 2:
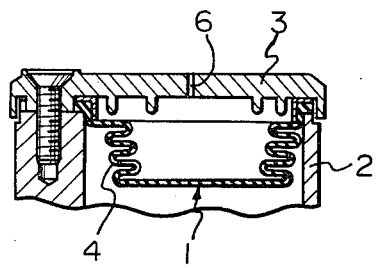
FIG. 2 is a view similar to FIG. 4, but showing another prior art diaphragm.

FIGS. 1 and 2 show two types of typical prior art diaphragms. In FIG. 1, a diaphragm 1 is disposed between an opening of a reservoir tank 2 and a cap 3. The diaphragm 1 comprises a corrugated portion 4 consisting of two sets of annular upwardly and downwardly projecting portions 4a, 5a and 4b, 5b which are arranged generally in the horizontal direction. The diaphragm 1 of FIG. 1 can effectively seal the liquid received in the reservoir tank 2 and can minimize the amount of air received in the reservoir tank 2 in supplying the liquid thereinto by removing the cap 3. The diaphragm 1 can expand in the downward direction in response to the decrease in the liquid level in the reservoir tank with a relatively little resistance. Thereby the mixing of air into the liquid in operation can be minimized.

FIG. 2 shows another prior art diaphragm wherein a plurality of annular horizontally projecting portions constitute a corrugated form. The operation of the diaphragm of FIG. 2 is similar to the diaphragm of FIG. 1, however, in manufacturing the diaphragm of FIG. 2, it is required to use an outer mold of split type and an inner mold of a complicated construction, thus, the manufacturing costs are expensive. The diaphragm of FIG. 1 can be manufactured by using upper and lower molds a one-piece type respectively, so that the manufacturing costs can be reduced. However, there is shortcoming in the diaphragm of FIG. 1 in that a plurality of annular spaces 5a, 5b are defined by respective annular downwardly projecting portions 4a, 4b such that the spaces 5a, 5b are surrounded by annular downwardly projecting portions and open in the downward direction. The spaces act as fluid trapping spaces, particularly when the diaphragm 1 is assembled in the reservoir tank in mounting the cap 3 on the reservoir tank, or when the level of the liquid is decreased and a substantial amount of foam is generated in the reservoir tank 2. The fluid (air or the foam) trapped in such annular spaces will sometimes be introduced into the hydraulic system, thereby causing the so-called air lock phenomenon.

The diaphragm 15 according to the invention is generally similar to the diaphragm 1 of FIG. 1 in that a plurality sets of annular upwardly and downwardly projecting portions is arranged in the horizontal direction to constitute a corrugated form. It will be noted that the downwardly projecting annular portions 4a and 4b in FIG. 1 are at the same level in the horizontal direction, and the downwardly projecting portions 15a and 15b of the diaphragm 15 are not at the same level, and that there is formed a closed space 18a defined by an upwardly projecting portion in the central portion of the diaphragm 1, and the central portion of the diaphragm 15 is defined by a downwardly projecting portion 15; however, the detailed arrangement of respective annular projecting portions is not essential and the invention can similarly be applied to the diaphragm 1 of FIG. 1.

According to the invention, cut-out portions 19a and 19b are formed respectively in the annular downwardly projecting portions 15a and 15b. The cut-out portion 19a is formed by interrupting a portion of the circumference of the annular downwardly projecting portion 15a to define a passage 17a which extends from a space 18a, which is surrounded by the annular downwardly projecting portion 15a, in the horizontally outward direction. Annular upwardly projecting portions 15c and 15d are respectively arranged on the inside and outside of and contiguous to the annular downwardly projecting portion 15a. Similarly, the cut-out portion 19b is formed by interrupting a portion of the circumference of the annular downwardly projecting portion 15b to define a passage 17b which extends from a space 18b, which is surrounded by the annular downwardly projecting portion 15b, in the horizontally outward direction. Thus, any fluid which would be trapped in spaces 18a and 18b can be released through the passages 17a and 17b. It will be noted that, in the embodiment, the annular upwardly projecting portion 15c and the annular downwardly projecting portion 15a constitute one set of annular upwardly and downwardly projecting portions according to the invention, and the annular upwardly projecting portion 15d and the annular downwardly projecting portion 15b constitute another set of annular upwardly and downwardly projecting portions according to the invention.

Figure 5:
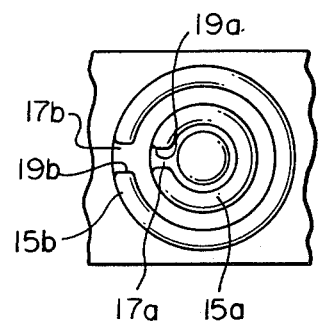
FIG. 5 is a bottom view of the diaphragm as viewed along arrow V in FIG 4.

The diaphragm 15 shown in the drawings includes two sets of annular upwardly and downwardly projecting portions having the form of concentric circles as viewed in the vertical direction (FIG. 5), however, the invention may be applied to diaphragms having a single set of annular upwardly and downwardly projecting portions or three or more sets, and the configuration of the annular projecting portions may be determined as desired. Further, two or more cut-out portions may be formed in an annular downwardly projecting portion.

As described heretofore, it is possible, according to the invention, to minimize the inclusion of atmospheric air in the hydraulic system by utilizing a relatively cheap diaphragm.

The invention is applicable to any desired reservoir tank used in hydraulic systems; however, the invention is particularly adapted to reservoir tanks in vehicle hydraulic braking systems wherein air contained in the reservoir tank will sometimes be included in the hydraulic liquid due to vibrations or the like.

What is claimed is:

1. A reservoir tank having a flexible diaphragm disposed above the liquid received in the reservoir tank for preventing the liquid from being exposed to atmospheric air, wherein said diaphragm includes at least one set of annular upwardly and downwardly projecting portions constituting a corrugated portion for permitting expanding or contracting of the diaphragm in the vertical directions, and at least one cut-out portion in the annular downwardly projecting portion for allowing the fluid which is trapped in a space, which is surrounded by the annular downwardly projecting portion, to escape in the horizontally outward direction.

2. A reservoir tank as set forth in claim 1 wherein there is provided a plurality of annular projecting portions having the form of generally concentric circles as viewed in the vertical direction.

3. A reservoir tank as set forth in claim 1 wherein a cap is provided to close an upper open end of the reservoir tank such as a supply opening, and the diaphragm is clamped between the cap and the open end of the reservoir tank.

4. A master cylinder for use in a hydraulic braking system of a vehicle and having a reservoir tank integrally formed therewith, wherein a flexible diaphragm is disposed above the liquid received in the reservoir tank for preventing the liquid in the reservoir tank from communicating with the atmosphere, said diaphragm including at least one set of annular upwardly and downwardly projecting portions constituting a corrugated portion to allow the diaphragm to be vertically expanded or contracted, and at least one cut-out portion in the annular downwardly projecting portion for allowing the fluid trapped in a space, which is surrounded by the annular downwardly projecting portion, to escape in the horizontally outward direction.

* * * * *